May 16, 1961  G. A. MAYER  2,983,983
SECTIONAL MOLD FOR USE IN PRODUCING BLOCKS
OF CEMENTITIOUS MATERIAL
Filed Aug. 27, 1956

INVENTOR.
George A. Mayer
BY
ATTORNEY.

United States Patent Office 2,983,983
Patented May 16, 1961

2,983,983

SECTIONAL MOLD FOR USE IN PRODUCING BLOCKS OF CEMENTITIOUS MATERIAL

George A. Mayer, Miami, Okla., assignor to Miami Stone, Inc., Miami, Okla., a corporation of Oklahoma Filed Aug. 27, 1956, Ser. No. 606,266

2 Claims. (Cl. 25—121)

This invention relates to a sectional mold for use in producing blocks of cementitious material, and more particularly, to a mold wherein the sections thereof normally disposed in end-to-end relationship, may be readily and quickly separated to release the blocks formed thereby after the said blocks have set or cured.

It is the most important object of the present invention to provide a sectional mold of the aforementioned character having the secttions thereof each formed to present a hollow, open top body when the sections are disposed in end-to-end relationship presenting a pair of sides, a bottom and a plurality of partitions extending between the sides and between the bottom and the open top of the body.

Another important object of the instant invention is to provide a sectional mold composed of a plurality of end-to-end sections and having the sections each provided with one of the partitions of the body, as well as opposed wings forming the sides of the body and a panel forming the bottom of the body to the end that the said body is complete when the sections are in proper relationship ready for receiving the cementitious block-forming material.

A further object of the instant invention is to provide a sectional mold having novel interlocking joints between the sections thereof to prevent relative shifting of the sections when the body contains the block-forming material.

A still further object of the present invention is to provide a sectional mold that is specially adapted for use in connection with an endless conveyor in a manner to cause the sections to be held together in a body-forming position along the upper and lower stretches of the conveyor, but adapted to separate, permitting removal of the blocks as the sections advance around the supporting shaft and sprocket wheel assemblies forming a part of the conveyor.

Figure 3:
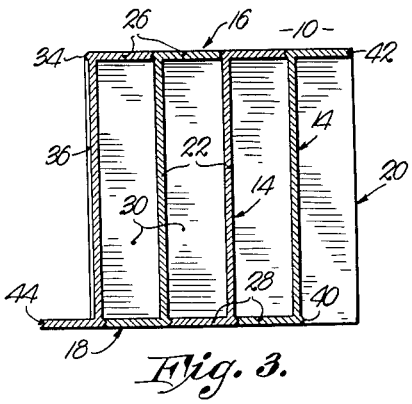
Fig. 3 is a fragmentary, transverse, cross-sectional view taken on line III—III of Fig. 2.
Figure 2:
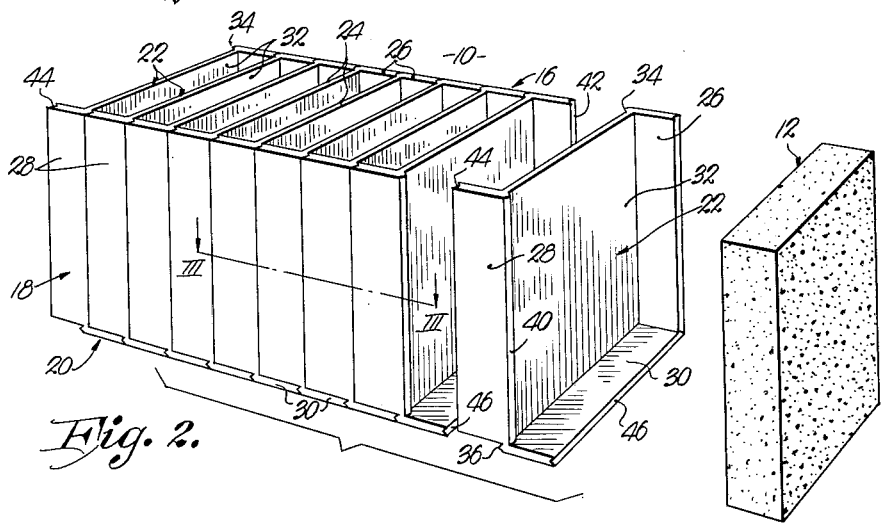
Fig. 2 is a perspective view illustrating the hollow, open top body that is presented by arranging a plurality of the sections shown in Fig. 1 in end-to-end relationship.
Figure 4:
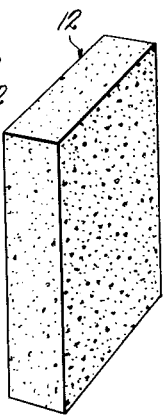
Fig. 4 is a perspective view of one of the blocks produced through use of the sectional mold shown in Figs. 2 and 3.

The sectional mold forming the subject matter of the instant invention as shown in Figs. 2 and 3 of the drawing is broadly designated by the numeral 10 and adapted to produce blocks of cementitious material in the nature of that shown in Fig. 4 and designated by the numeral 12, although it is to be understood that articles of other shapes and configurations might be made if desired, simply by varying the nature of the mold 10. In any event, the said mold 10 is made from a plurality of separable end-to-end sections 14 presenting a hollow, open top body having a pair of spaced, elongated, parallel sides 16 and 18, a bottom 20 and a plurality of partitions 22.

Figure 1:
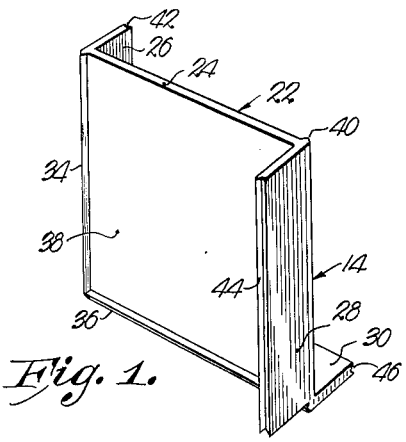
Figure 1 is a perspective view of one of the sections of a sectional mold for use in producing blocks of cementitious material, made pursuant to the instant invention.

Since the sections 14 are identical, but one will be described referring essentially to Figure 1, wherein it is seen that each section 14 consists of one of the normally vertical, polygonal partitions 22 having opposed, parallel faces and four edges, the uppermost of which can be seen in Figure 1 and is designated by the numeral 24.

Each partition 22 is provided with a pair of elongated, parallel, oppositely-extending wings 26 and 28 forming one part of the sides 16 and 18 respectively of the mold 10 when sections 14 are assembled in the manner shown by Figs. 2 and 3. The wings 26 and 28 are adjacent the vertical edges of the partition 22 and are perpendicular to the proximal vertical faces of the latter.

The lowermost edge of the partition 22 however, is provided with a laterally-extending panel 30 forming a part of the bottom 20 when the sections are in end-to-end relationship. The panel 30 extends from the partition 22 in the same direction as the wing 26 and is not only perpendicular to the proximal face of partition 22, but is perpendicular to the wing 26 with which it joins. While the wings 26 and 28 are preferably flush at their uppermost ends with the edge 24 of partition 22, it is noted that the lower edge of wing 28 terminates above the lower face of panel 30 to the end that it rests flatly upon the upper face of the next adjacent panel 30 when the sections are in end-to-end relationship.

The wing 26 and the panel 30 extend laterally from face 32 of partition 22, but are provided with longitudinal, preferably V-shaped ribs 34 and 36 respectively, which project slightly beyond the opposite face 38 of the partition 22.

By the same token, the wing 28 projects laterally from the face 38 of partition 22 and is provided with a longitudinal rib 40 forming one of its vertical edges and projecting slightly beyond the face 32 of partition 22. The opposite longitudinal edges of the elongated wings 26 and 28, as well as the panel 30, are provided with grooves 42, 44 and 46 respectively, corresponding in transverse configuration to the ribs 34, 36 and 40.

Consequently, when the sections 14 are disposed in end-to-end relationship as illustrated in Figs. 2 and 3, there is presented a series of polygonal cavities between the partitions 22 open only at the top thereof and adapted to receive the cementitious material to form a like number of blocks 12. The sections 14 may be held against separation in any suitable manner (not shown) whereupon, after hardening or setting of the material forming the blocks 12, the sections 14 may be readily and quickly separated to release the blocks 12 as is all quite apparent from viewing Figs. 1 to 4 inclusive.

Figure 5:
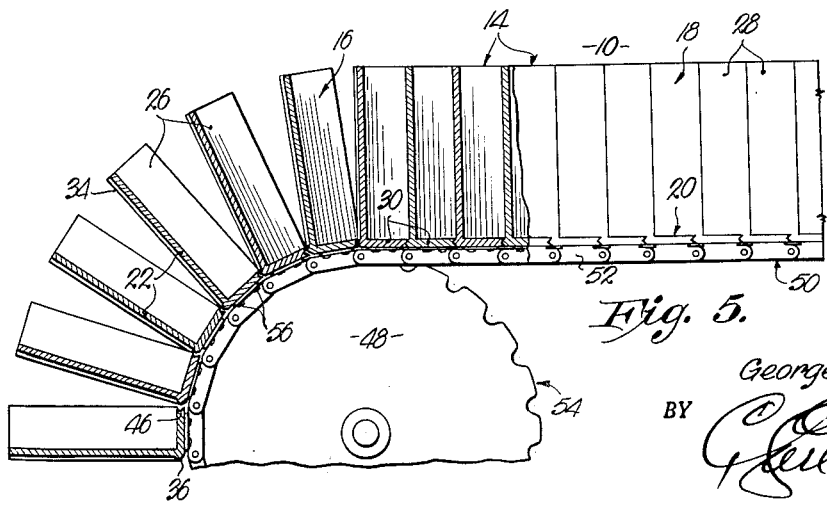
Fig. 5 is a fragmentary, side elevational view of the mold illustrated in Figs. 2 and 3 mounted on an endless conveyor.

The construction above outlined adapts the sectional mold 10 advantageously for use in connection with an endless conveyor broadly designated by the numeral 48, in the manner illustrated by Fig. 5 of the drawing. The conveyor 48 may be of essentially conventional character in that the same is provided with preferably two or more endless chains or the like 50, each consisting of a number of hingedly interconnected links 52 in the usual manner. The chains 50 are trained about a pair of opposed sprocket wheel and axle assemblies, one of which is seen in Fig. 5 and designated broadly by the numeral 54. The bottom 20 of the sectional mold 10, i.e., the plurality of elongated panels 30 forming the bottom 20, are secured directly to the links 52 of the chains 50 in any suitable manner as by use of a number of fasteners 56.

Manifestly, the form of the chains 50 and especially the nature and length of the links 52 is such as to dispose the sections 14 in end-to-end relationship along the uppermost and lowermost stretches of the chains 50 between the two spaced-apart, opposed assemblies 54 as shown in Fig. 5 in the same manner as the sections 14 are disposed in forming the complete mold 10 as shown in Figs. 2 and 3.

When the mold 10 is disposed along the uppermost stretch of the conveyor chains 50, the cementitious material for forming the blocks 12 may be poured into the mold 10 in the usual manner. Thereupon, after hardening of the material, the conveyor 48 may be advanced to progressively carry the sections 14 around one of the assemblies 54 which automatically separates the sections 14 as is clear in Fig. 5 to permit removal of the hardened blocks 12. As soon as the empty mold 10 returns to the uppermost stretch of the conveyor, the sections 14 thereof automatically reassume the closed position with all of the ribs 34, 36 and 40 extending into corresponding grooves 42, 46 and 44 respectively of next adjacent sections.

Having thus described the invention what is claimed as new and desired to be secured by Letters Patent is:

1. A sectional mold comprising a hollow open-top body having a pair of spaced sides, a bottom and a number of polygonal partitions having opposed, parallel faces, there being a plurality of sections adapted to be mounted in side-by-side relationship, each section including one of said partitions, each partition having an upper and a lower edge and a pair of side edges, a pair of spaced, oppositely extending flat, parallel wings and a panel, said panel being integral with and underlying the lower edge of said partition and having its major portion extending from the partition in the same direction as one of said wings, the longitudinal edge of said major portion remote from said partition having a groove formed therein the side margins of which are a pair of substantially acute angled lands, the opposite longitudinal edge of said panel having a rib formed thereon and extending from said partition in the direction of the other of said wings, each of said wings being integral with and overlapping a side edge of the partition and having a lower edge integral with and in partial overlying relationship to said panel, the wings forming said sides and the panels forming said bottom when the sections are disposed in end-to-end relationship, each wing having the longitudinal edge thereof outermost from said partition provided with a groove therein the side margins of which present a pair of substantially acute angled lands, the opposite longitudinal edges of said wings adjacent said partition having ribs formed thereon whereby said sections are interlocked when disposed in side-by-side relationship, the substantially acute angled lands interiorly of said mold when assembled abuttingly and sealingly engaging one of the parallel opposing faces of a partition thereby preventing seepage from the mold of the material being molded.

2. A sectional mold comprising a hollow open-top body having a pair of spaced sides, a bottom and a number of upright polygonal partitions having opposed, parallel faces, there being a plurality of sections adapted to be mounted in side-by-side relationship, each section including one of said partitions, each partition having an upper and a lower edge and a pair of side edges, a pair of spaced, oppositely extending, flat, parallel wings each having a vertical dimension approximately equal to the vertical dimension of said upright polygonal partitions and a horizontal dimension less than one-half the horizontal dimension of said partition and a panel, said panel being integral with and underlying the lower edge of said partition and having its major portion extending from the partition in the same direction as one of said wings, the longitudinal edge of said major portion remote from said partition having a groove formed therein, the opposite longitudinal edge of said panel having a rib formed thereon and extending from said partition in the direction of the other of said wings, each of said wings being integral with and overlapping a side edge of the partition and having a lower edge in partial overlying relationship to said panel, the wings forming said sides and the panels forming said bottom when the sections are disposed in end-to-end relationship, each wing having the longitudinal edge thereof outermost from said partition provided with a groove, the opposite longitudinal edges of the wings and adjacent said partition having ribs formed thereon whereby said sections are interlocked when disposed in side-by-side relationship.

References Cited in the file of this patent

UNITED STATES PATENTS

| | | |
|---|---|---|
| 57,791 | Stafford | Sept. 4, 1866 |
| 191,504 | Woodward | May 29, 1877 |
| 785,578 | Sawyer | Mar. 21, 1905 |
| 839,812 | Cooley | Jan. 1, 1907 |
| 1,261,662 | Wiederhold | Apr. 2, 1918 |
| 1,760,283 | Pedersen | May 27, 1930 |
| 1,846,290 | Walter | Feb. 23, 1932 |
| 2,545,029 | Hemb | Mar. 13, 1951 |
| 2,763,909 | Guimont | Sept. 25, 1956 |

FOREIGN PATENTS

| | | |
|---|---|---|
| 814,575 | Germany | Sept. 24, 1951 |
| 181,038 | Great Britain | June 14, 1922 |